Figure 2:
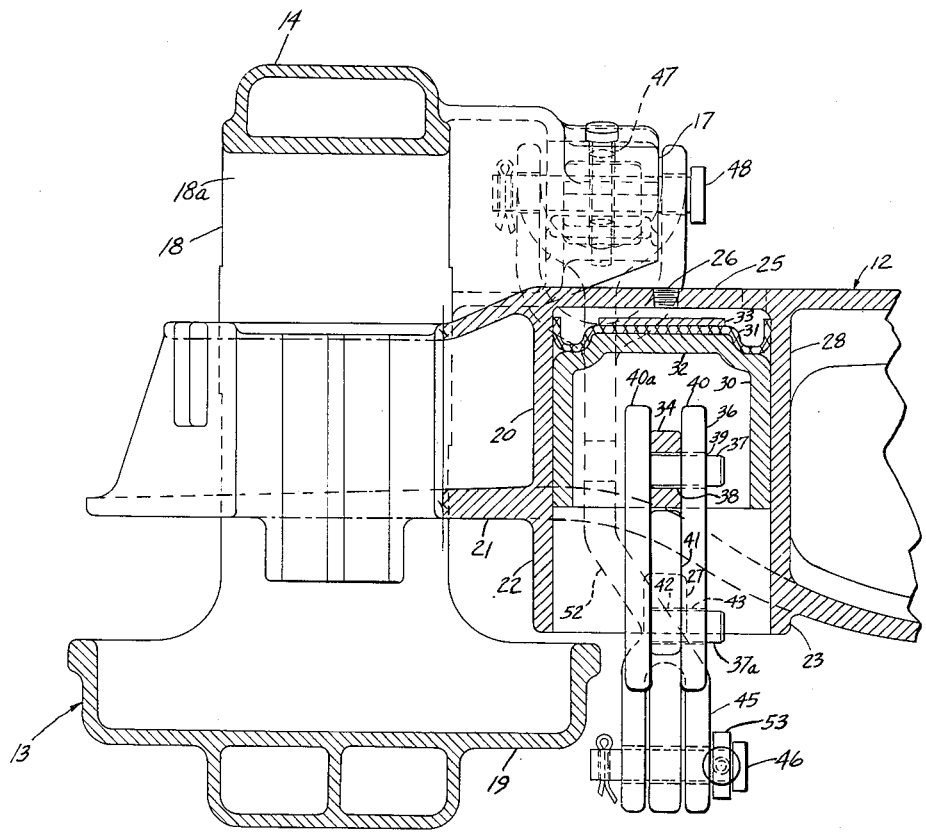

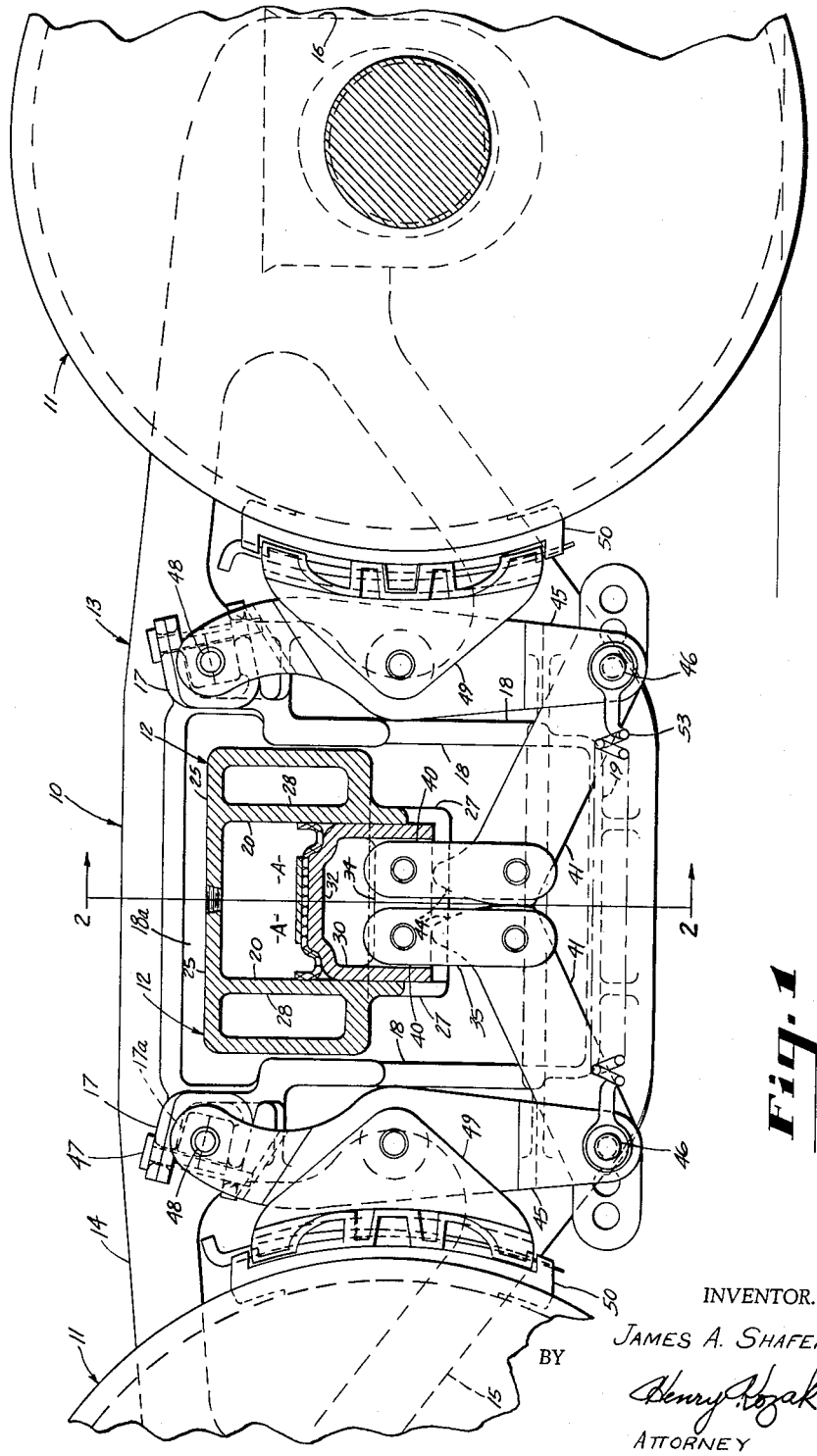

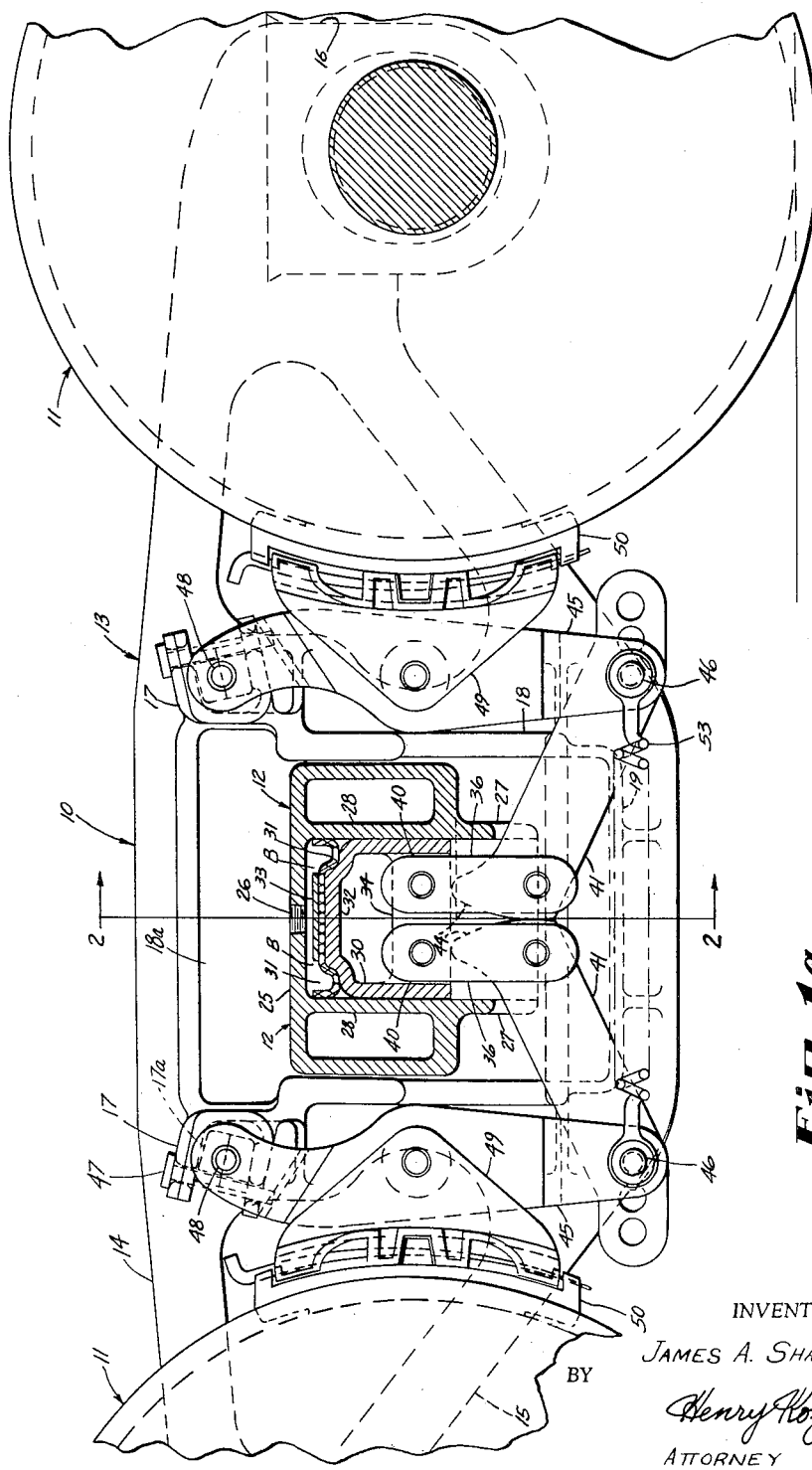

United States Patent Office 3,023,855
Patented Mar. 6, 1962

3,023,855
VARIABLE PRESSURE BRAKE RIGGING
James A. Shafer, East Cleveland, Ohio, assignor to National Castings Company, a corporation of Ohio
Filed Mar. 17, 1958, Ser. No. 721,860
5 Claims. (Cl. 188—195)

This invention relates generally to brake rigging for railway vehicles and more particularly, to a railway vehicle of the type which utilizes a four-wheel car truck. Additionally, this invention relates to brake rigging of the type wherein the pressure necessary to ultimately apply force against the brake shoes will vary according to the load weight of the railway vehicle.

At present, conventional brake riggings, in the main, utilize a central power means in the form of an air cylinder and air reservoir connected to the underframe of the railway vehicle. In order to transfer power from this centrally located power means to the individual brake shoes, an elaborate and cumbersome linkage system, involving both the underframe of the railway vehicle and the car truck, is necessary. Various types of rods, levers, brackets and lever carriers are supported by the underframe of the railway vehicle and ultimately connect to the brake beam supported by the railway car truck. The car truck, in turn, has its own system of levers, rods, brackets and carriers for applying the braking force to the brake shoe. Conventional brake riggings of this type, while generally satisfactory in operation are, nonetheless, due to the aforementioned multiplicity of moving parts, subject to disadvantages from the standpoint of cost, weight, and space utilization.

Improvements in brake rigging for railway vehicles have been directed toward eliminating some of the parts and conserving space. In many instances, these improvements still employ the underframe of the railway car to support rods, levers, and other parts of the brake system linkage. In other instances, attempts have been made toward removing the brake beam and other linkage parts of the brake rigging generally associated with the car truck. These improvements, while helpful have not completely solved the problem, since both the underframe of the railway vehicle and the car truck still support linkage mechanisms of the associated brake rigging.

Also troublesome in conventional brake riggings is the fact that the air pressure operating the brake rigging system is substantially constant. Consequently, under empty load conditions, the constant pressure may be too great and result in the undesirable "sliding of the wheels" while under partial or full load conditions it may be for efficient braking action. Under partial or full load conditions, there is naturally more adhesion between the wheel and the track and more air pressure may be applied without risk of "sliding the wheels." Therefore, there is a need in conventional brake riggings for means which will vary the air pressure actuating the rigging depending upon the particular load condition of the railway car.

Accordingly, it is the primary object of this invention to provide a brake rigging which is economical in cost and maintenance and which is simpler in arrangement and operation.

Another object of this invention is to provide a brake rigging for a railway vehicle in which the use of the conventional brake beam is eliminated and in which the linkage mechanisms are associated with the car truck only. The only connection between the underframe and the truck is that of an air hose or other suitable pressure conducting means.

Still another object of this invention is to provide a brake rigging in which power means is located in the car truck and control the movements of the linkage mechanism of the brake rigging directly associated therewith.

A further object of this invention is to provide a brake rigging in which the power means is supported by the transverse load carrying member of the car truck in such a manner that other parts of the rigging directly associated with the power means will not be affected by the load carrying member as the latter moves in response to varying loads. Associated with the power means are a piston and a linkage mechanism which are caused to operate only upon introduction of air pressure into the power means or air cylinder which is built into the load supporting member.

A still further object is to provide, in a brake rigging of the above-mentioned type, means for varying the degree of air pressure necessary to ultimately actuate the brake shoes. Due to the fact that the piston associated with the air cylinder will not move with the air cylinder as the latter moves downward with the transverse load carrying member, the volume existing between the top of the piston and the top wall of the cylinder will lessen in accordance with the increase in load applied to the member. As this volume decreases, the pressure actuating the piston will correspondingly become greater and, hence, the greater air pressure desirable under load condition of operation are made available.

These and other objects will become more apparent upon the reading of the following description, considered and interpreted in the light of the accompanying drawings, in which:

FIG. 1 and FIG. 1a are side views, partly in section, of a railway car truck embodying the invention. The views are taken inboardly of the side frame looking toward the outside of the car truck in order to better highlight the brake rigging of this invention. Also, in the interest of clarity and better understanding, one side only of the car truck is shown and will be described; it being understood that the opposed side of the car truck contains parts that are identical in construction and operation.

FIG. 2 is a view of one side of a railway car truck, partly in section, taken generally along the line 2—2 of FIG. 1 and showing the relationship of the brake rigging to the transverse load supporting member when a maximum load is being supported.

Referring to FIG. 1, there is shown a railway car truck 10 comprising wheel and axle assemblies 11, a transverse load supporting member or bolster 12, and side member or frame 13. The side frame 13 has the usual compression member 14 and tension member 15 which, at their merging ends, are formed with journal boxes 16. Compression member 14 has the usual integrally formed hanger brackets 17 and is joined with the tension member 15 by the spaced vertical columns 18 which form the opening 18a through which the transverse load supporting member or bolster 12 is received. Integral with tension member 15 is spring seat portion 19 which is for the purpose of carrying the usual bolster supporting springs (not shown). It is to be understood that the bolster is provided with the usual lugs (not shown) for interlocking the bolster to the vertical columns 18.

Built integrally within the bolster member 12 and provided with machine-finished interior walls is the power means or air cylinder 20. As will be most clearly seen in FIG. 2, the walls of air cylinder 20 extend downwardly of the bottom wall 21 of the bolster as at 22 and 23 in order to provide increased depth to the cylinder. In the top wall 25 of the air cylinder 20 an intake aperture 26 is provided, while slots 27 are disposed on diametrically opposite sides of the air cylinder side walls 28 for purposes which will hereinafter be more fully explained.

Received for reciprocal action within the air cylinder 20 is the piston 30. A diaphragm 31, composed of any suitable material, preferably of leather or rubber-like composition, is secured to the top wall 32 of piston 30 by means of plate 33 in order to assure an airtight relationship between the cylinder walls and the piston. Integral with piston 30 and centrally disposed therein is transverse wall 34 to which links 35 and 36 are loosely connected in any suitable manner. In the embodiment shown, links 35 and 36 are each composed of pairs of plates 40 and 40a. Plate 40a of each pair is provided with an integral upper pin 37 which is adapted to pass through aperture 38 in transverse wall 34 and through aperture 39 on plate 40.

Each link 35 and 36 has pivotally connected to the lower end thereof a spreader arm 41. In the embodiment shown, an integral lower pin 37a is provided on plate 40a and passes through an aperture 42 in the arm 41 and through aperture 43 on the inboard plate 40 to accomplish the connection desired. Each arm 41 has at its upper end a cam surface 44 which is always in bearing relationship with surface 44 of the opposing arm in order to provide proper spreading of arms 41 when the piston 30 moves downwardly. Each arm 41, as best seen in FIGS. 1 and 1a, is angularly disposed relative to the vertical and is pivotally connected at its lower end to brake lever 45 by means of a pin 46. Brake lever 45 is generally vertically disposed and its bifurcated upper end is pivotally connected to brake hanger bracket 17. Bracket 17 is provided with the usual bracket wear shoes 17a which are secured within the bracket by means of a pin 47. A horizontal pin 48 pivotally connects and fulcrums the brake lever 45 to hanger bracket 17 and wear shoes 17a. Pivotally supported intermediate the ends of the brake lever 45 is brake head 49 with its associated brake shoe 50 adapted for contact with the periphery of an associated wheel. Brake lever 45 is offset as at 52 to provide clearance from spring seat portion 19 during operation.

In operation, the piston 30 is actuated by the introduction of air through the aperture 26 which receives a connection from a hose (not shown) leading to the main air pressure system of the railway vehicle. Introduction of air pressure into cylinder 20 will cause the piston 30 to move downwardly. The links 35 and 36 connected to the transverse wall 34 of piston 30 will also move downwardly, causing the cam surfaces 44 to bear against one another and force spreader arms 41 in the direction of the respective adjacent wheels. Such movement of arm 41 causes brake lever 45 to pivot about its fulcrum point on the bracket 17, with the result that the brake shoe 50 associated with brake head 49 is brought into engagement with the periphery of the wheel of the railway car. A horizontal tension spring 53 connected between the pins 46 returns levers 45 and shoes 50 to released position when the introduction of air pressure has been discontinued.

Referring now to FIG. 1, in conjunction with an explanation of the pressure-varying characteristics of this invention, the bolster member 12 is shown in its position of empty load, and in FIG. 1a it is shown in its position of full load. It will be seen that the piston 30 and the brake elements which are associated therewith retain their released position regardless of the amount of load supported by the bolster member 12. Those skilled in the art will understand that there is no air pressure in the line leading from the reservoir on the railway vehicle to the air cylinder 20 until it is desired to operate the brakes. It is customary to charge the main air pressure system with a predetermined amount of air pressure after a series of railway vehicles have been train connected. This same amount of air pressure is retained in the reservoir of each individual car but is prevented by valve means from entering the hose or other suitable connection leading to the cylinder 20. The valve means which permits entry of air into cylinder 20 is actuated only when the engineer releases pressure in the main air pressure system of the connected train to obtain a braking action. Obviously, then, there will be no resistance afforded to the movement of bolster member 12 in its movement from the described empty load position to the full load position, such as would influence the piston 30. The air, if any, in the line leading from the air reservoir of the railway vehicle to the air cylinder 20, being under no pressure, will merely be displaced or relocated.

It will be evident that during the movement of the bolster 12 from its position of empty load in FIG. 1 to its position of full load in FIG. 1a, the volume existing between the top wall of the cylinder 20 and the top wall 32 of piston 30 will progressively be reduced. The greatest volume will be that existing under conditions of empty load as represented at chamber A, while the least volume will be that existing under conditions of full load, as shown at chamber B. In this regard, the chamber B represents a condition of maximum load so that it will be understood that a definite volume of air will always exist between the top wall of air cylinder 20 and the top wall 32 of piston 30.

It follows, then, as the bolster member 12 is made to support progressively heavier loads, the chamber A above the piston will progressively reduce in volume. In view of the fact that the volume is so reduced under a heavy load the air pressure acting on the piston 30 during a brake application will necessarily be greater than the pressure on the piston during brake application with a light load. Consequently, under empty load conditions the least amount of air pressure is available for actuating the piston 30 and this pressure will desirably increase coincident with the increasing loads supported by the bolster member 12 and will be at its highest under conditions of maximum load.

It will be seen in FIG. 1a under full load conditions of operation that in the movements of the bolster downwardly in response to the varying loads, spreader arm 41 will be received within the aforementioned slot 27 on the side walls 28 of the cylinder 20 to avoid any interference between bolster 12 and the operation of the arm 41.

There is shown, then, in this invention a brake rigging which will retain its released condition despite all movements of the bolster member in response to varying conditions of load. In so accomplishing this result, the invention has greatly reduced the number of parts necessary to adequately construct a brake rigging. In this invention, it has also been shown how the simplified parts are associated with the bolster and are contained on the car truck only. Also shown is the operation of the brake rigging in response to variable air pressures as the volume existing between the cylinder top wall and the piston is varied accordingly as the load weight of the bolster member is varied.

The terms and expressions which have been employed are used as terms of description and not of limitation and there is no intention of excluding such equivalents of the invention described, or of the portions thereof, as fall within the purview of the claims.

What is claimed is:

1. In a brake rigging for a railway vehicle, the combination of a car truck having a pair of side frames, a transverse load carrying bolster extending between said frames, wheel and axle assemblies at the ends of said frames, power means built into each end of said bolster, said power means comprising an air cylinder formed integral with and disposed vertically in said bolster end, brake levers fulcrumed at one end from said side frames, the other end of said levers being operatively connected to a piston disposed in said cylinder, and brake means connected to said levers intermediate the ends thereof and being engageable with the associated wheels during braking operations.

2. A railway car truck comprising a side frame, a bolster member, a pair of brake levers fulcrumed to said frame, a brake shoe pivotally supported intermediate the ends of each of said brake levers, an air cylinder formed within said bolster member, a piston reciprocable in said cylinder and having an integral transverse wall, a pair of links loosely connected to said transverse wall, a pair of spreader arms operatively connecting said links and said levers for applying a braking force to said levers upon actuation of said piston, said spreader arms each having a cam surface in contact with the cam surface of the other arm.

3. A railway car truck comprising a side frame, a bolster resiliently supported on said frame for predetermined range of vertical movement relative thereto, said bolster having a top wall defining the upper end of a cylindrical cavity formed therein; a piston reciprocable in said cavity, said bolster and said cylindrical cavity being movable relative to said piston in response to increase in load supported by the bolster, a brake lever having one end fulcrumed from said side frame and carrying a brake shoe adapted to engage the periphery of an associated railway wheel, linkage means for connecting said lever to said piston to operate said lever upon actuation of said piston through air pressure applied to said cavity, spring means connecting said lever for maintaining said piston in released position, said bolster having a downward travel such that for all positions thereof a clearance exists between the top wall of said piston and said bolster top wall.

4. A railway car truck comprising a side frame, a bolster resiliently supported on said frame for predetermined range of vertical movement relative thereto, said bolster having a top wall defining the upper end of a cylindrical cavity formed therein, a piston reciprocable in said cavity and having an integral transverse wall, a pair of brake shoes each of which is adapted to engage the periphery of an associated railway wheel, linkage means operatively connecting said transverse wall and said shoes, said means comprising a pair of links connected to said transverse wall, a pair of brake levers fulcrumed to said side frame and carrying said brake shoes, and a spreader arm joining each of said links with one of said brake levers and resilient means retaining said linkage means and said piston in released position, the released position of said piston being such that a clearance exists between said piston and said top wall for all positions of said bolster within said range of vertical movement relative to the side frame.

5. In a brake mechanism for a railway car truck, a bolster having an air cylinder formed therein adjacent an end thereof, an air pressure actuated piston reciprocable in said cylinder, a brake lever for pivotal mounting on an associated side frame, and link means operatively connecting said piston and said lever.

References Cited in the file of this patent

UNITED STATES PATENTS

| | | |
|---|---|---|
| 175,886 | Westinghouse | Apr. 11, 1876 |
| 432,960 | Welsh | July 22, 1890 |
| 720,828 | Mann | Feb. 17, 1903 |
| 1,344,129 | Hartill-Law | June 22, 1920 |
| 1,776,250 | Craig | Sept. 23, 1930 |
| 1,782,589 | Wahlert | Nov. 25, 1930 |
| 1,936,717 | Johnson et al. | Nov. 28, 1933 |
| 2,118,753 | Baselt | May 24, 1938 |
| 2,887,186 | Travilla | May 19, 1959 |